UNITED STATES PATENT OFFICE.

THOMAS J. ELLIOTT, OF NEW YORK, N. Y.

IMPROVEMENT IN VARNISHES FOR DESTROYING INSECT LIFE.

Specification forming part of Letters Patent No. 120,812, dated November 14, 1871.

*To all whom it may concern:*

Be it known that I, THOMAS J. ELLIOTT, of the city, county, and State of New York, have invented a new and useful solution or combination of matter to be added to any good commercial varnish, which, while not impairing its quality, shall cause it to have the effect, when laid on, of destroying all insect life with which it comes in contact.

The mode of compounding or making the same is as follows, viz.: Take, for example, thirty-four gallons of any good commercial varnish, and add thereto eight gallons of a solution or combination of matter, as follows—that is to say, thirty-two ounces (apothecaries' weight) of corrosive sublimate; a like weight, viz., thirty-two ounces, of sal ammoniac and of gum or crude camphor, in four gallons of spirits of turpentine and four gallons of alcohol; and a good article of commercial varnish will remain, which, when laid on in the usual way, will cause it to have the effect of destroying all insect life with which it may come in contact.

I do not claim the manufacture of varnish nor any of the elements of my new and useful solution or combination of matter; but What I do claim, and desire to secure by Letters Patent, is—

The addition to any good commercial varnish of my solution of corrosive sublimate, sal ammoniac, and gum or crude camphor in alcohol and spirits of turpentine, in the proportions stated, and in the ratio of solution to quantity of varnish as set forth, and for the purpose specified.

In witness whereof I hereto set my hand this 22d day of September, A. D. 1871.

THOMAS J. ELLIOTT.

Witnesses:
WM. F. MCNAMARA,
O. S. X. PECK.